US008335857B1

United States Patent
Rai et al.

(10) Patent No.: US 8,335,857 B1
(45) Date of Patent: Dec. 18, 2012

(54) SYSTEM AND METHODS OF DATA TRANSMISSION TO DEVICES

(75) Inventors: Deveshkumar Narendrapratap Rai, Overland Park, KS (US); Maulik K. Shah, Overland Park, KS (US); Sachin R. Vargantwar, Overland Park, KS (US); Debasish Sarkar, Irvine, CA (US); Jasinder Pal Singh, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 157 days.

(21) Appl. No.: 12/470,052

(22) Filed: May 21, 2009

(51) Int. Cl.
G06F 15/16 (2006.01)
(52) U.S. Cl. ........ 709/234; 709/203; 709/223; 709/224; 370/230
(58) Field of Classification Search .................. 709/234, 709/223–224, 203; 370/230
See application file for complete search history.

(56) References Cited

U.S. PATENT DOCUMENTS

| | | | |
|---|---|---|---|
| 5,751,723 A * | 5/1998 | Vanden Heuvel et al. | 370/528 |
| 6,289,054 B1 * | 9/2001 | Rhee | 375/240.27 |
| 6,760,303 B1 * | 7/2004 | Brouwer | 370/229 |
| 7,106,738 B2 * | 9/2006 | Saidi et al. | 370/392 |
| 7,392,279 B1 * | 6/2008 | Chandran et al. | 709/200 |
| 7,596,142 B1 * | 9/2009 | MacAdam | 370/392 |
| 7,706,255 B1 * | 4/2010 | Kondrat et al. | 370/219 |
| 7,730,202 B1 * | 6/2010 | Biederman et al. | 709/235 |
| 7,757,016 B2 * | 7/2010 | Kokubo et al. | 710/22 |
| 7,787,496 B1 * | 8/2010 | Singh et al. | 370/474 |
| 7,801,128 B2 * | 9/2010 | Hoole et al. | 370/389 |
| 7,822,051 B1 * | 10/2010 | Perelstain et al. | 370/412 |
| 2002/0103915 A1 * | 8/2002 | Shuster | 709/229 |
| 2002/0145974 A1 * | 10/2002 | Saidi et al. | 370/230 |
| 2003/0097416 A1 * | 5/2003 | Sano et al. | 709/212 |
| 2004/0215955 A1 * | 10/2004 | Tamai et al. | 713/150 |
| 2005/0094655 A1 * | 5/2005 | Newson et al. | 370/412 |
| 2005/0223136 A1 * | 10/2005 | Tanaka et al. | 710/22 |
| 2007/0019553 A1 * | 1/2007 | Sagfors et al. | 370/236 |
| 2007/0239862 A1 * | 10/2007 | Bronez et al. | 709/223 |
| 2008/0008203 A1 * | 1/2008 | Frankkila et al. | 370/412 |
| 2008/0062877 A1 * | 3/2008 | Chen | 370/235 |
| 2008/0117820 A1 * | 5/2008 | Miyazaki et al. | 370/234 |
| 2008/0270643 A1 * | 10/2008 | Tashiro | 710/35 |
| 2009/0116397 A1 * | 5/2009 | Denby et al. | 370/252 |
| 2009/0220238 A1 * | 9/2009 | Wang et al. | 398/79 |
| 2010/0197405 A1 * | 8/2010 | Douceur et al. | 463/42 |
| 2010/0235419 A1 * | 9/2010 | Yamamoto | 708/300 |
| 2010/0238931 A1 * | 9/2010 | Meyer et al. | 370/392 |
| 2010/0290536 A1 * | 11/2010 | Iwahashi et al. | 375/240.25 |

* cited by examiner

*Primary Examiner* — David Lazaro
*Assistant Examiner* — Waseem Ashraf (57) ABSTRACT

A method, system, and medium are provided for detecting data intended for transmission to a first device on a network. A slot for transmission of data is assigned to a second device based on the amount of data intended for transmission to the first device. This may allow modification or control of the amount of padding or extra information used in data transmissions.

2 Claims, 8 Drawing Sheets

SYSTEM AND METHODS OF DATA TRANSMISSION TO DEVICES

SUMMARY

Embodiments of the invention are defined by the claims below, not this Summary. A high-level overview of various aspects of the invention are provided here for that reason, to provide an overview of the disclosure, and to introduce a selection of concepts that are further described in the Detailed Description. This Summary is not intended to identify key features or essential features of the claimed subject matter, nor is it intended to be used as an aid in isolation to determine the scope of the claimed subject matter.

In one embodiment, the present invention is directed to one or more tangible computer-readable media having computer-useable instructions embodied thereon for performing a method of providing data to receiving devices. The method includes receiving a first amount of data intended for transmission to a first receiving device, determining that the first amount of data is below a threshold amount of data for transmission to the first receiving device, and delaying transmission of the first amount of data to the first receiving device until the earliest of two events: (1) receipt of an additional amount of data intended for transmission to the first receiving device that, when added to the first amount of data, creates a total amount of data that meets or exceeds the threshold amount of data; or (2) expiration of a predetermined time period.

In another embodiment, the present invention is directed to one or more tangible computer-readable media having computer-useable instructions embodied thereon for performing a method of data transmission, including receiving a first amount of data for transmission to a first receiving device and determining a first amount of data padding that would need to be added to the first amount of data such that a sum of the first amount of data and the data padding meets a threshold amount of data for transmission to the first receiving device. A first ratio comprising a ratio of the first amount of data padding to the first amount of data is calculated, and transmission of the first amount of data is delayed upon determining that the first ratio is equal to or greater than a predetermined transmission ratio.

In yet another embodiment, a first amount of data is received and a computing device is configured to compare the first amount of data to the threshold amount of data for transmission to the first receiving device. It is determined that the first amount of data is below a threshold amount of data for transmission to the first receiving device, and it is determined a first amount of data padding would need to be added to the first amount of data such that the sum of the data and data padding meets a threshold amount for transmission. A first ratio comprising a ratio of the first amount of data padding to the first amount of data is calculated, transmission of the first amount of data is delayed upon determining that the first ratio is equal to or greater than a predetermined transmission ratio.

BRIEF DESCRIPTION OF THE SEVERAL VIEWS OF THE DRAWINGS

Illustrative embodiments of the present invention are described in detail below with reference to the attached drawing figures, wherein.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

The transmission of data packets over a network to a receiving device often includes transmitting data in packets defined by slots. In some instances, the amount of data to be transmitted over the network may be less than the amount of data that can comprise a packet of data. In other instances, a minimum size limit for a payload of information may be set such that the amount of data to be transmitted to a receiving device must be at least the minimum amount for transmission to occur. In either case, the data may be padded, for instance, with zeros or other placeholders, in order to reach an appropriate size for transmission before the data is transmitted to the receiving device. Such padding may increase the network traffic due to the extra information being transmitted, causing data transmission over the network to be less efficient. Ratios of data to padding may be used to determine to transmit data or to delay transmission of data.

Embodiments of the present invention may be embodied as, among other things, methods, systems, or sets of computer-useable instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
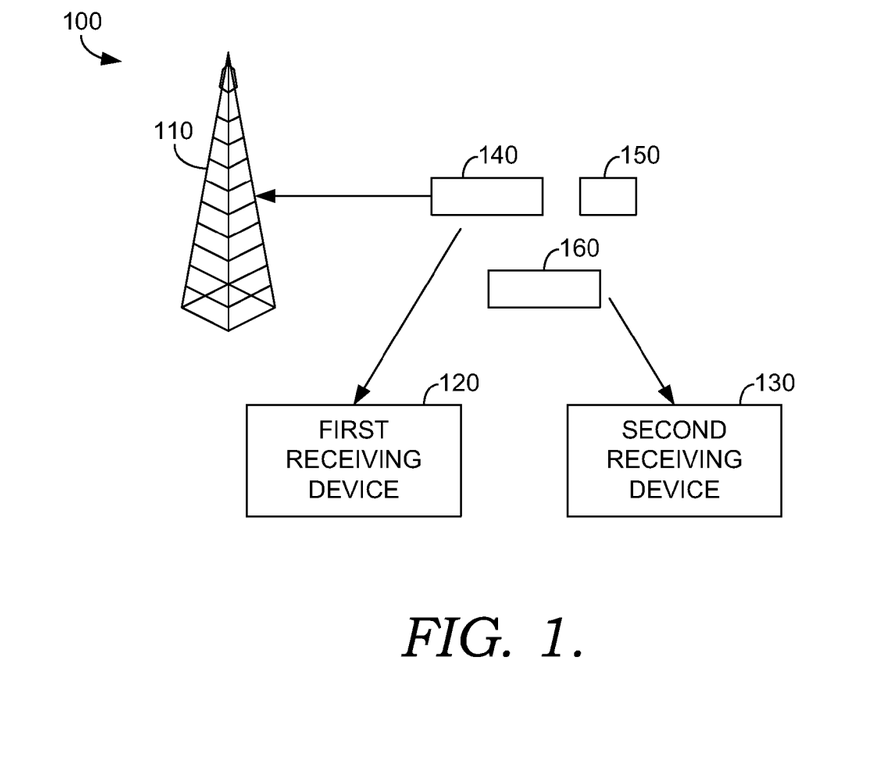
FIG. 1 is a schematic diagram depicting an exemplary network architecture for use in accordance with an embodiment of the present invention.

With reference to FIG. 1, a schematic diagram depicting an exemplary network architecture suitable for use with embodiments of the present invention is shown and designated generally as reference numeral 100. The network architecture includes, a network 110, a first device 120 and a second device 130, the first and second devices 120, 130 being in communication with the network 110. The network 100 may be, by way of example only, a radio access network (RAN). Examples of radio access networks include GSM (global system for mobile communications) radio access networks or UMTS (universal mobile telecommunications system) radio access networks. Under TIA standards such as IS-136 and IS-95, the present invention may operate with the air interface of networks. The network 110 may exist or communicate between a core network and the first and second receiving devices 120, 130.

An evolution-data optimized or evolution-data only (EVDO) network is one telecommunications standard that may be used for the transmission of data over a radio access network. EVDO networks may use multiplexing techniques, such as code division multiple access (CDMA) or time division multiple access (TDMA), to process network throughput. In other embodiments, the network 110 may be a network with slower or faster data transmission rates than EVDO networks. In yet other embodiments, the network 110 may comprise more than one network. Any and all such variations, and any combination thereof, are contemplated to be within the scope of embodiments of the present invention.

The network 110 is configured to transmit data, such as data amounts 140, 150 and/or 160, to the first and second receiving devices 120, 130. Data may be associated with a device by being intended for transmission to the device, or through other means, such as by tagging, identifying, requesting or subscribing to the information. Each of the first and second receiving devices 120, 130 may be one or more types of client, handheld or stationary devices. Additionally, any user equipment, terminal equipment or mobile station may act as a receiving device 120, 130. In accordance with embodiments hereof, any type of information that is capable of being transmitted as packets of data may be transmitted over the network 110, as more fully described below.

As previously stated, the transmission of data packets over a network (e.g., network 110) to a receiving device (e.g., first receiving device 120 and/or second receiving device 130) often includes transmitting data in packets defined by slots (not shown). A slot may be any defined interval of time, and a time slot defines a packet of data. For example, an EVDO network with a signaling rate of 2.45 Mbps creates a signal with every bit occupying a slot with a time of 1/2,544,000 seconds. Alternatively, an EVDO network with a signaling rate of 3.1 Mbps creates a signal with each bit occupying a slot with a time of 1/3,100,000 seconds. When data is transmitted over a network (e.g., network 110), the amount of data may equal only a portion of a slot, an entire slot or more than one slot of time. Therefore, the data to be transmitted may consist of one packet of data, less than one packet of data, or more than one packet of data. The threshold amount of data for transmission to a device may be a slot or the amount of data defined by or equal to a slot, or the threshold may be a limit or amount of data used for transmission of data to devices.

Slots may be associated with a particular receiving device. In other words, the network 110 may assign certain slots to be used for transmitting data to certain receiving devices. In the embodiment illustrated in FIG. 1, the network 110 receives a first amount of data 140 and an additional amount of data 150, both intended for transmission to the first receiving device 120. The network 110 also receives an amount of data 160 intended for transmission to a second device 130. Other amounts of data intended for transmission to the first or second receiving device may be received or monitored by the network 110.

Figure 2:
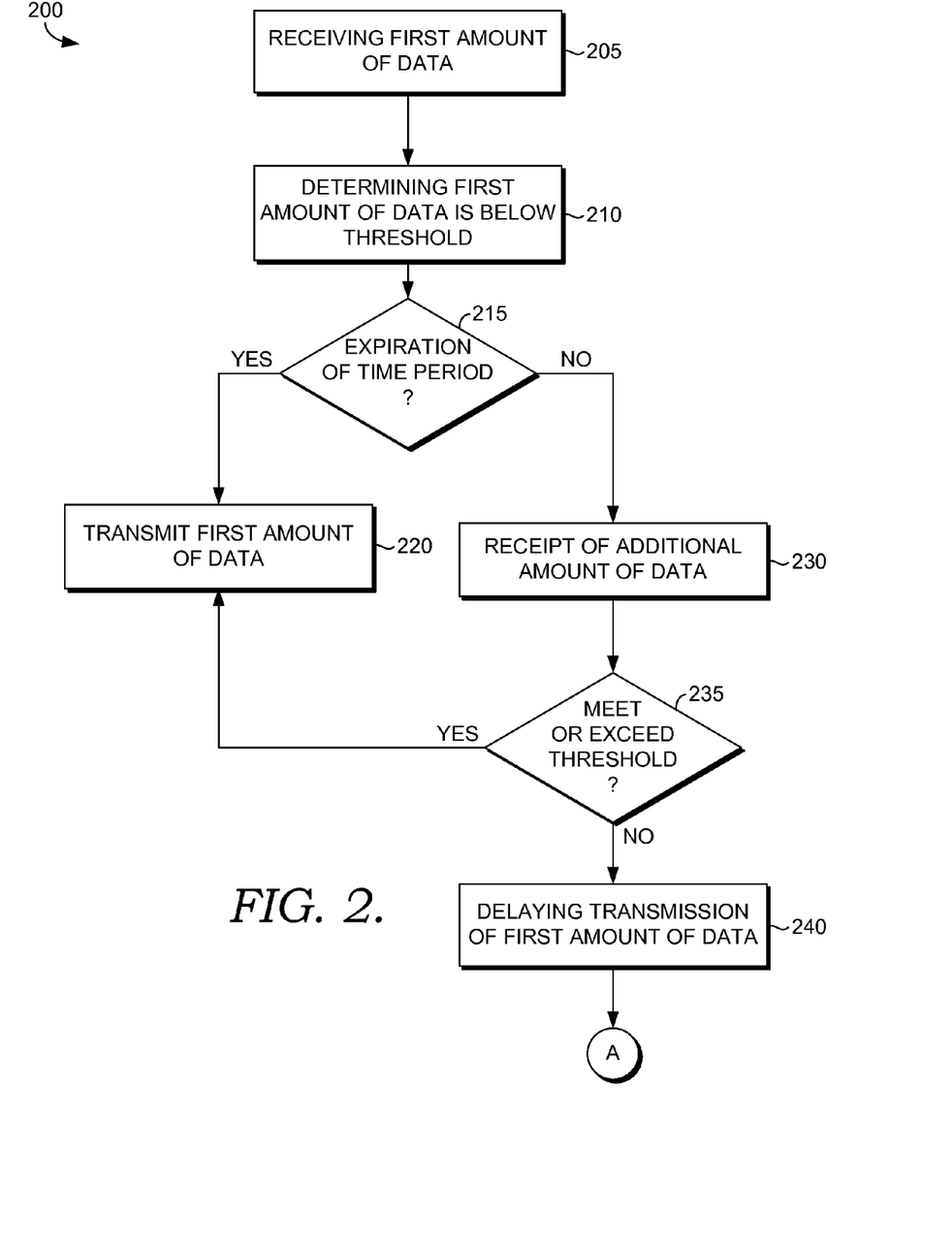
FIG. 2 is a flow diagram illustrating a method of transmitting data in accordance with an embodiment of the present invention.

FIG. 2 is a flow diagram illustrating a method of transmitting data in accordance with an embodiment of the present invention, designated generally as 200. A first amount of data 140 intended for transmission to a first receiving device 120 is received at step 205. At step 210, it is determined that the first amount of data 140 is below a threshold amount of data for transmission of data to the first receiving device 120. As shown at 215, if it is determined a time period has expired, the data is transmitted (220). If a time period has not expired, additional data 150 is received at step 230. Where the total amount of data meets or exceeds a threshold, data is transmitted to the first receiving device 120 (235). As shown at 240, transmission is delayed where the total amount of data does not meet or exceed a threshold.

Figure 3:
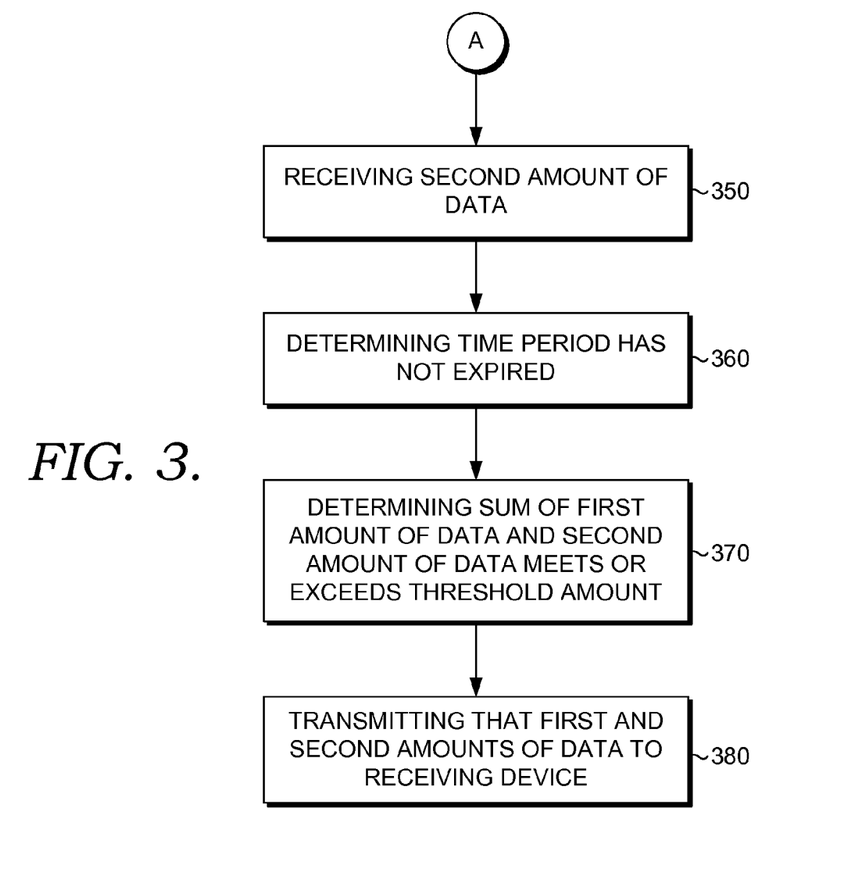
FIG. 3 is a flow diagram illustrating a method of transmitting data to a receiving device in accordance with an embodiment of the present invention.

FIG. 3 is a flow diagram illustrating a method of transmitting data to a receiving device in accordance with an embodiment of the present invention. The method 300 illustrated in FIG. 3 begins at point A, corresponding to point A in FIG. 2. As shown in FIG. 3, a second amount of data 150 intended for transmission to the first receiving device is received (350). It is determined that a predetermined time period has not expired at 360, and is determined that the sum of the first amount of data 140 and the second amount of data 150 meets or exceeds the threshold amount of data for transmission to the first receiving device at 370. The first and second amounts of data 140, 150 are transmitted to the first device 120 (380).

Figure 4:
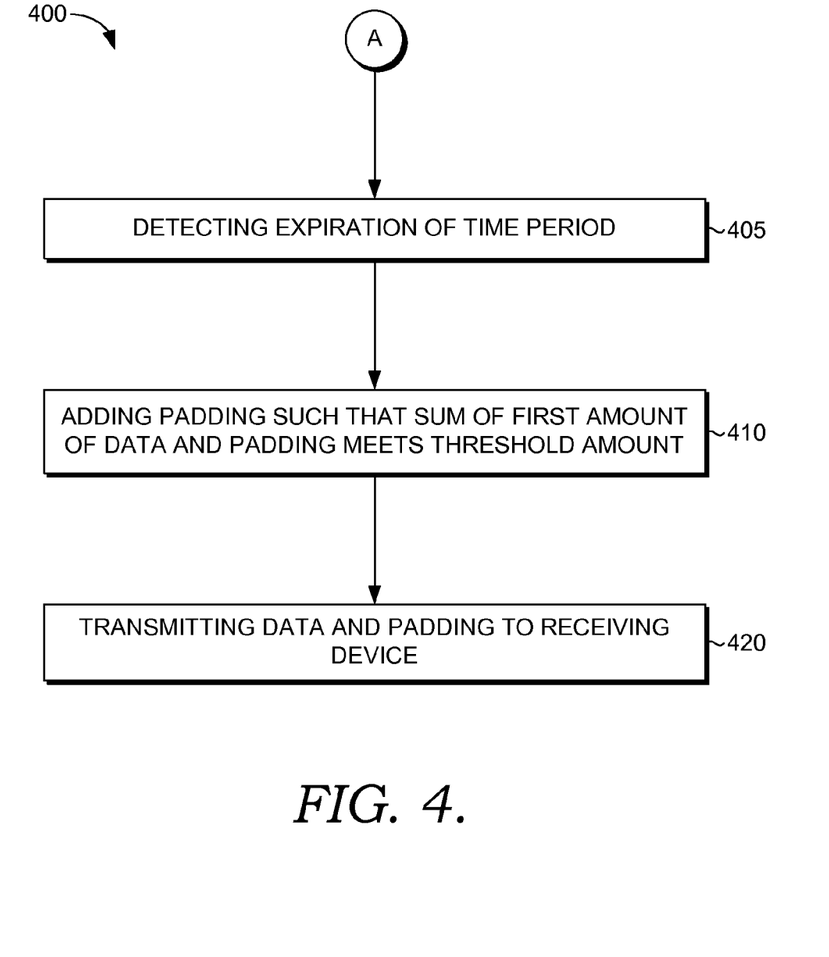
FIG. 4 is a flow diagram illustrating a method of transmitting data to a receiving device in accordance with an embodiment of the present invention.

Turning now to FIG. 4, a flow diagram illustrating a method of transmitting data to a receiving device in accordance with an embodiment of the present invention is shown. The method of transmitting data in FIG. 4 is indicated generally by 400 and begins at point A, corresponding to point A in FIG. 2. The embodiment shown in FIG. 4 includes the steps of detecting the expiration of the predetermined time period (405), adding data padding to the first amount of data such that a sum of the first amount of data and the data padding meets the threshold amount of data (410), and transmitting the first amount of data and the data padding to the first receiving device 120 (420).

Figure 5:
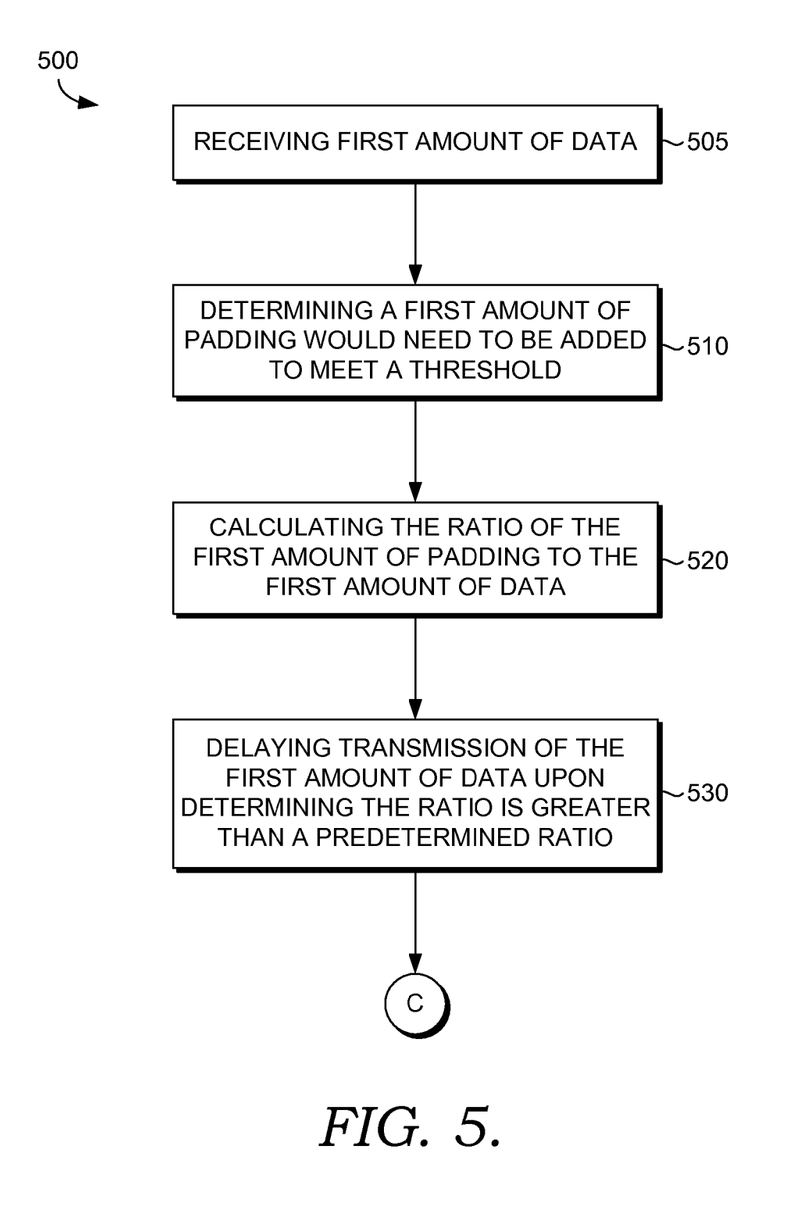
FIG. 5 is a flow diagram illustrating a method of transmitting data in accordance with an embodiment of the present invention.

The flow diagram in FIG. 5, designated generally as 500, illustrates a method of transmitting data in accordance with an embodiment of the present invention. The embodiment shown in FIG. 5 includes receiving a first amount of data 140 intended for transmission to a first receiving device 120 at 505. At step 510, it is determined a first amount of data padding would need to be added to the first amount of data 140 such that a sum of the first amount of data 140 and the data padding meets a threshold amount of data for transmission to the first receiving device 120. A first ratio comprising a ratio of the first amount of data padding to the first amount of data 140 is calculated (520). Upon determining that the first ratio is equal to or greater than a predetermined transmission ratio at step 530, transmission of the first amount of data is delayed.

The predetermined time period, the threshold and/or the transmission ratio may be configured manually or automatically by software or hardware associated with the network 110. For example, the type of receiving device 120 may affect the time period, threshold or transmission ratio, based on device identification information detected by the network 110 or made available by the device 120, or publicly available information regarding devices. A plan, time period or location associated with the device 120 may affect the time period, threshold or transmission ratio used in some embodiments. In other cases, the time period, threshold or transmission ratio may be dynamic or responsive to one or more characteristics of the network 110, such as the demand by devices and other network components, or other occurrences, such as an outage, virus, slow or weak area of the network 110, monitoring, costs associated with certain activities or regulatory issues.

Embodiments include configuring the time period, threshold or transmission ratio to optimize transmission of data to one or more devices, or a dynamic time period, threshold or transmission ratio that includes optimizing transmission of data. Configuration or modification of these amounts or ratios may obtain an efficiency or throughput of data within a certain range. An algorithm or other formula may determine the amounts of data and space used in various embodiments of the invention. The users of the receiving devices 120, 130 may not discern the delay to receive additional data. This delay for additional data may occur for a predetermined or maximum amount of time, or it may occur until a signal is received indicating the end of the transmission. In fact, overall, users may perceive an increase in network speed or data transmission due to the reduced padding of data.

Figure 6:
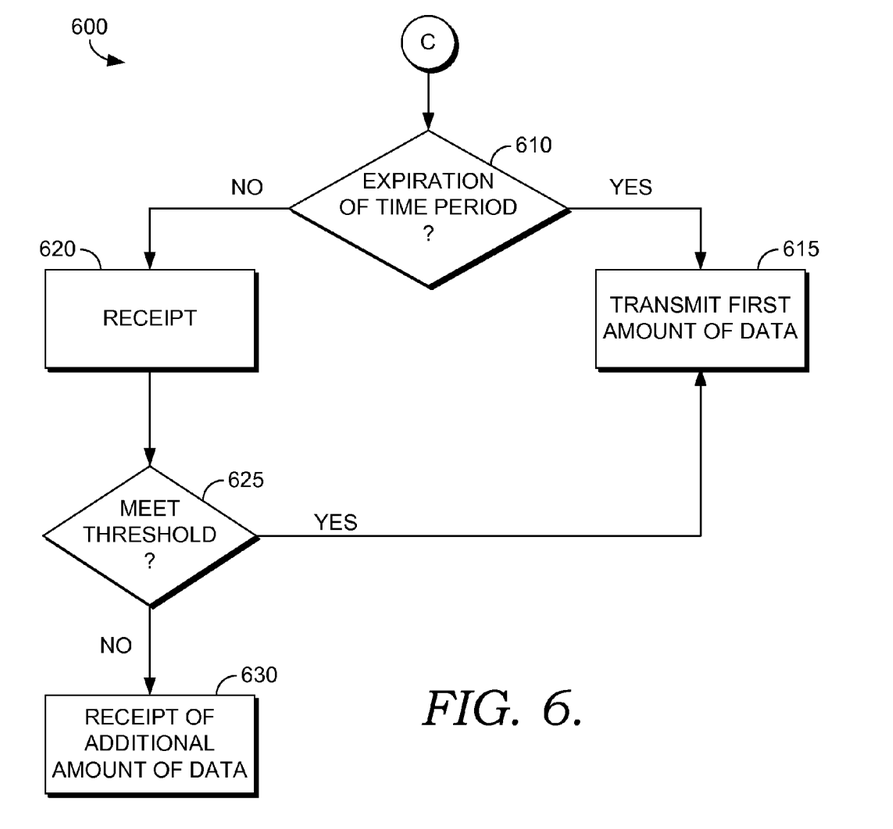
FIG. 6 is a flow diagram illustrating a method of transmitting data in accordance with an embodiment of the present invention.

FIG. 6 is a flow diagram illustrating a method of transmitting data in accordance with an embodiment of the present invention. The method of transmitting data in FIG. 6 is designated generally as 600 and begins at point C, corresponding to point C in FIG. 5. As shown at 610, where it is determined a time period has expired, data is transmitted (615), and where it is determined a time period has not expired, data is received (620). At 625, it is determined an amount of data meets a threshold and data is transmitted (615), or it is determined the data does not meet a threshold and additional data is received (630). In an embodiment, transmission is delayed until the earliest of (1) receipt of an additional amount of data 150 that, when added to the first amount of data 140, creates a total amount of data that meets or exceeds the threshold amount of data at 625, or (2) expiration of a predetermined time period at 610.

In an embodiment, a computing device may be configured to compare the first amount of data 140 to the threshold amount of data. An embodiment may include determining that the first ratio is equal to or greater than a predetermined transmission ratio and receiving a second amount of data 160 for transmission to a second receiving device 130. The second amount of data 160 may be transmitted to the second receiving device 130 based on a determination that the first ratio is equal to or greater than a predetermined transmission ratio.

Figure 7:
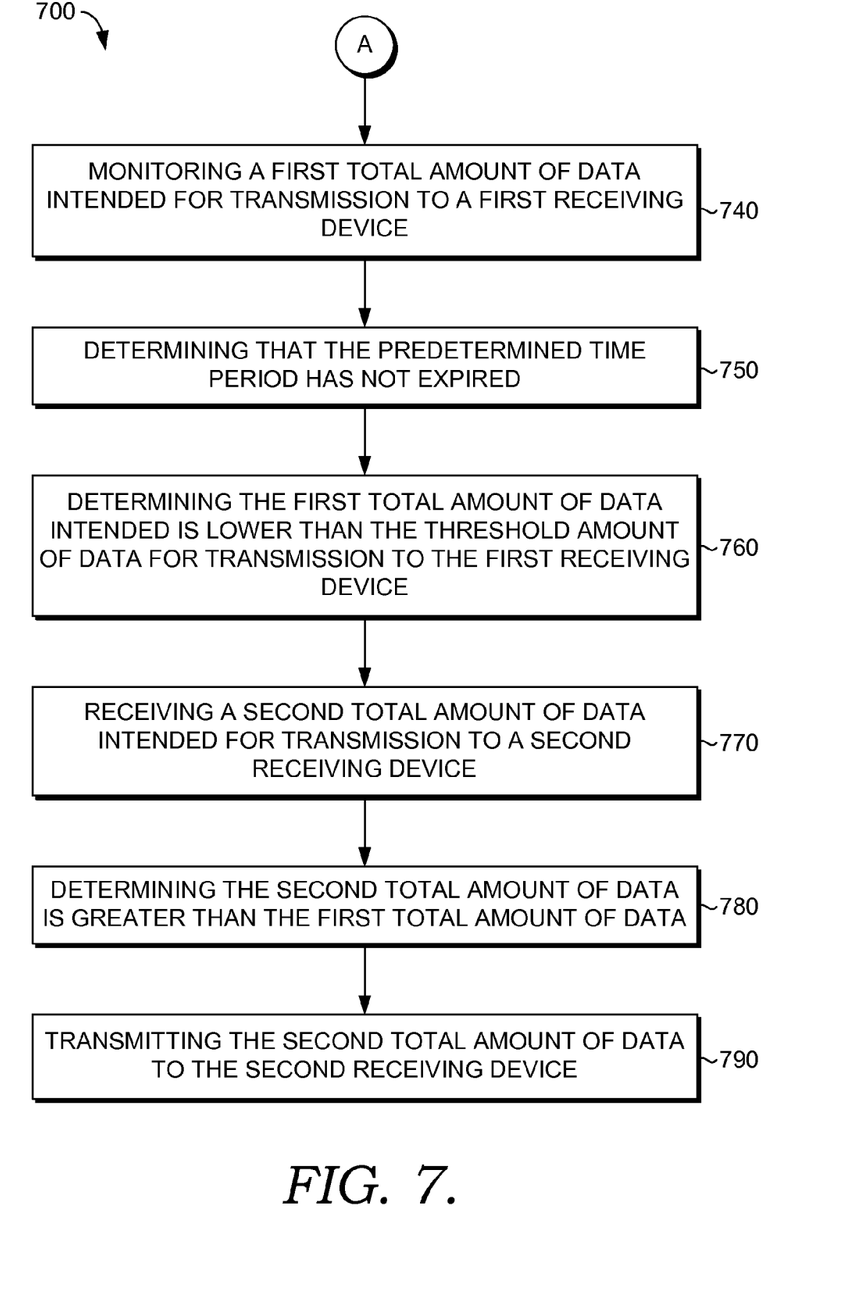
FIG. 7 is a flow diagram illustrating a method of transmitting data in accordance with an embodiment of the present invention.

FIG. 7 is a flow diagram illustrating a method of transmitting data in accordance with an embodiment of the present invention, indicated generally as a method 700. The method 700 shown in FIG. 7 begins at point A, corresponding to point A in FIG. 2. FIG. 7 shows monitoring a first total amount of data intended for transmission to the first receiving device at 740, determining that the predetermined time period has not expired at 750, and determining that the first total amount of data intended for transmission to the first receiving device 120 is lower than the threshold amount of data for transmission to the first receiving device at 760. At step 770, second total amount of data intended for transmission to a second receiving device 130 is received. If it is determined that the second total amount of data intended for transmission to the second receiving device 130 is greater than the first total amount of data intended for transmission to the first receiving device 120 at step 780, the second total amount of data is transmitted to the second receiving device 130 (790).

Figure 8:
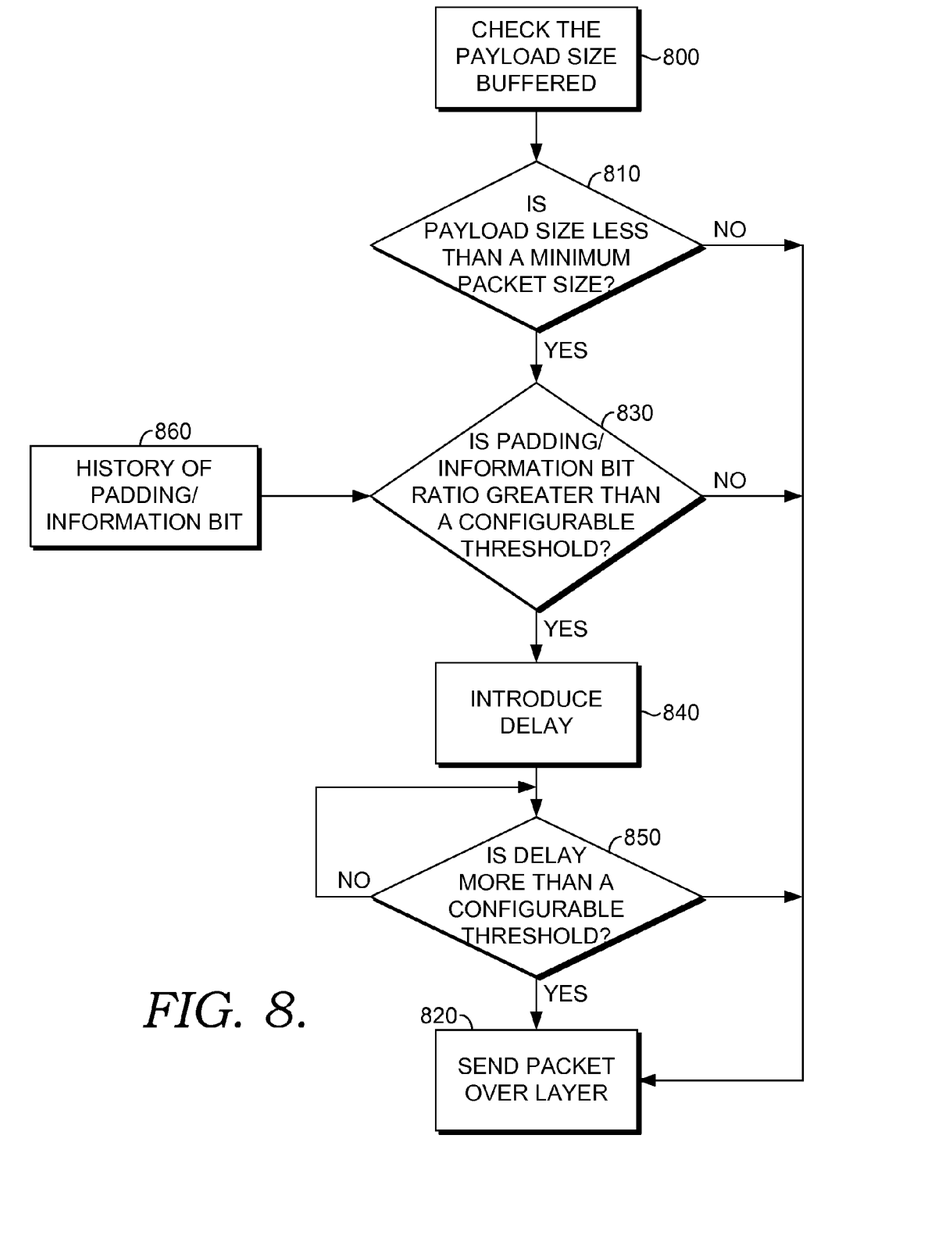
FIG. 8 is a flow diagram illustrating a method of sending data in accordance with an embodiment of the present invention.

Turning now to FIG. 8, a flow diagram illustrating a method of sending data in accordance with an embodiment of the present invention is shown. The present invention may be used when processing large amounts of data for receiving devices, such as during file transfer protocol. An embodiment shown in FIG. 8 shows checking the payload size in step 800. The payload size in the buffer may be the amount of data the network received for a certain receiving device, or it may be the remaining data that comprises less than one packet or slot 200. At step 810, it is determined whether the payload size is less than a minimum packet size. If the answer is no (meaning the payload size is greater than the minimum packet size), then the packet is transmitted (820).

If the payload size in step 810 is less than the minimum packet size, then it is determined whether the padding information bit ratio is greater than a configurable threshold (830). The decision in step 830 may be informed by the history of padding and information bits on the network or other networks (860), and the configurable threshold may be any amount set by a user, administrator, network, provider or component. If the padding information bit ratio is not greater than a configurable threshold, then the packet is transmitted (820).

If the padding information bit ratio is greater than a configurable threshold, then a delay is introduced at 840. This delay may continue or repeat until it reaches a configurable threshold (see step 850). In one embodiment, after the delay exceeds a threshold, the packet is transmitted (820). In other embodiments, as indicated above, the delay may occur for a predetermined or maximum amount of time, or it may occur until a signal is received indicating the end of the transmission.

The padding information bit ratio in step 830 may be the ratio between the padding, or extra, information added to data packets and the actual data. This ratio may be monitored and modified by affecting certain parameters or settings in the network 110 or devices. In other embodiments, as opposed to configuring a ratio of padding to data, the present invention may be used to avoid padding or to employ padding only when necessary. For example, in some cases, the delay to certain users may have no perceived effect, while padding data may slow network 110 traffic. In these cases, the collection of additional data for one device 120 may continue in order to eliminate padding as much as possible or completely. The second total amount of data may also be padded. In an embodiment, the first amount of data 140 is directed or pushed to the first receiving device 120 without modification. This is illustrated in FIG. 8 and may be referred to as sending the digital packet over the physical layer.

In an embodiment, receiving a first amount of data 140 intended for transmission to a first receiving device 120 includes an indication (not shown) that the additional amount of data 150 intended for transmission to a first receiving device 120 exists. The predetermined time period may be adjusted based on an indication that the additional amount of data intended for transmission to a first receiving device exists. For example, the predetermined time period may be greater or extended based on additional data 150 expected to be received for transmission to the first device 120.

A computing device may be configured to compare the first amount of data 140 to the threshold amount of data for transmission to the first receiving device 120, and it may be determined that a first amount of data padding that would need to be added to the first amount of data 140 to meet a threshold amount of data for transmission to the first receiving device 120. A first ratio comprising a ratio of the first amount of data padding to the first amount of data may be calculated, and transmission of the first amount of data 140 may be delayed upon determining that the first ratio is equal to or greater than a predetermined transmission ratio. The expiration of a predetermined time period may be determined, and data padding may be added to the first amount of data 140 such that a sum of the first amount of data and the data padding meets a threshold amount of data for transmission to the first device 120, and the data may be transmitted to the first device 120.

In some cases, it may be determined that the first ratio is equal to or greater than a predetermined transmission ratio. A second amount of data 160 intended for transmission to a second receiving device may be received, and a second amount of data padding that would need to be added to the second amount of data 160 such that a sum of the second amount of data 160 and the data padding meets a threshold amount of data for transmission to a second receiving device may be determined. A second ratio comprising a ratio of the second amount of data padding to the second amount of data may be calculated and compared to the first ratio. Transmission of the second amount of data 160 to the second receiving device may be based on the comparison of the first ratio to the second ratio. As discussed above, the receiving the first amount of data 140 intended for transmission to a first receiving device 120 may include receiving an indication that an additional amount of data intended for transmission to the first receiving device 120 exists.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more tangible, non-transitory computer-readable media having computer-useable instructions embodied thereon for performing a method of transmitting data, the method comprising:

receiving a first amount of data intended for transmission to a first receiving device at a first point in time;

determining, utilizing a computing process, that the first amount of data is below a threshold amount of data for transmission to the first receiving device;

determining that a predetermined time period has not expired, wherein the predetermined time period is dynamically responsive to one or more of:

(1) information associated with the first receiving device including at least one of identification information, a plan associated with the first receiving device, or a location associated with the first receiving device, and         (2) one or more characteristics of a network over which data transmission is to occur including at least one of demand by devices and other network components, outage, virus, slow or weak area of the network, monitoring, costs associated with network activities and regulatory issues;

receiving a second amount of data intended for transmission to a second receiving device at a second point in time that is later than the first point in time;

determining that the second amount of data intended for transmission to the second receiving device is greater than the first amount of data intended for transmission to the first receiving device; and     based on the determination that the second amount of data intended for transmission to the second receiving device is greater than the first amount of data intended for transmission to the first receiving device and based on determining that the predetermined time period has not expired, preferentially transmitting the second amount of data to the second receiving device.

2. The one or more tangible, non-transitory computer-readable media of claim 1, wherein the method further comprises:

subsequent to preferentially transmitting the second amount of data to the second receiving device, detecting the expiration of the predetermined time period;

adding data padding to the first amount of data such that a sum of the first amount of data and the data padding meets a threshold amount of data; and     transmitting the first amount of data and the data padding to the first receiving device.

\* \* \* \* \*